US005406835A

United States Patent [19]

Doll

[11] Patent Number: 5,406,835

[45] Date of Patent: Apr. 18, 1995

[54] METHOD FOR MONITORING THE SWITCHING PROCESS OF A COUPLING DEVICE

[75] Inventor: Gehard Doll, Stuttgart, Germany

[73] Assignee: Mercedes Benz AG, Stuttgart, Germany

[21] Appl. No.: 139,807

[22] Filed: Oct. 22, 1993

Related U.S. Application Data

[63] Continuation-in-part of Ser. No. 63,711, May 21, 1993, Pat. No. 5,351,661.

[30] Foreign Application Priority Data

Oct. 23, 1992 [DE] Germany ........................ 42 35 796.9

[51] Int. Cl.[6] ........................ G01M 15/00; F01L 1/34

[52] U.S. Cl. ................................ 73/118.1; 123/90.16; 73/49.7

[58] Field of Search .................... 73/118.1, 49.7, 117.2; 123/90.39, 90.15, 90.16, 90.17, 90.44

[56] References Cited

U.S. PATENT DOCUMENTS

| | | | |
|---|---|---|---|
| 4,901,685 | 2/1990 | Fukuo et al. | 123/90.16 |
| 4,907,550 | 3/1990 | Inoue et al. | 123/90.16 |
| 4,942,853 | 7/1990 | Konno | 123/90.16 |
| 5,074,145 | 12/1991 | Hattori et al. | 73/118.1 |
| 5,297,505 | 3/1994 | Doll et al. | 123/90.16 |

FOREIGN PATENT DOCUMENTS

| | | |
|---|---|---|
| 0265281 | 4/1988 | European Pat. Off. . |
| 0293209 | 11/1988 | European Pat. Off. . |
| 0297791 | 1/1989 | European Pat. Off. . |
| 0353862 | 2/1990 | European Pat. Off. . |
| 0364069 | 4/1990 | European Pat. Off. . |
| 4221135 | 6/1993 | Germany . |

OTHER PUBLICATIONS

French Search Report, Jan. 28, 1994.
European Search Report, Nov. 18, 1993.

*Primary Examiner*—Richard E. Chilcot, Jr.
*Assistant Examiner*—James M. Olsen
*Attorney, Agent, or Firm*—Evenson, McKeown, Edwards & Lenahan

[57] ABSTRACT

The invention relates to a method for monitoring the switching process of a coupling device for inlet or outlet valves. The valve is actuated by two transmission elements which can be coupled to one another by means of a coupling device and are driven by two cams with different cam elevations. The coupling device consists of a bolt which is guided, so as to be capable of moving by means of a pressure medium, in two bores which are arranged on the transmission elements and are placed flush. According to the invention, an evaluation device is provided with which it is monitored whether the bolt reaches the coupled position. For this purpose, the evaluation device detects the signal of a pressure sensor arranged in the control pressure line. In this process, whether the coupled position has been reached can be detected by the occurrence of a pressure surge in the control pressure line which is caused by the striking of the bolt against a stop.

16 Claims, 3 Drawing Sheets

METHOD FOR MONITORING THE SWITCHING PROCESS OF A COUPLING DEVICE

This is a continuation-in-part application of my application Ser. No. 08/063,711, filed May 21, 1993, now U.S. Pat. No. 5,351,661.

BACKGROUND AND SUMMARY OF THE INVENTION

The invention relates to a method and apparatus for monitoring the switching process of a coupling device for inlet valves and outlet valves of an internal combustion engine.

European patent EP 0 265 281 discloses a device in which a monitoring device for detecting the position of the coupling device is provided. For this purpose, a second pressure line in which a pressure sensor is arranged, an opening which connects the second pressure line to the bore of the coupling device and recesses on the piston of the coupling device are provided. The piston, in an uncoupled position of the coupling device, enabling pressure medium to flow out of the second pressure line via the recesses and sealing the opening in the coupled position. Thus, the position of the coupling device can be determined from the pressure applied.

This arrangement has the disadvantage that a second pressure line is necessary. In addition, with a multi-cylinder internal combustion engine it is not possible to determine at which coupling device a fault occurs.

In addition, European patent EP 0 293 209 discloses a monitoring device with electrical proximity sensors. However, this arrangement is very complex and therefore expensive.

Therefore, the invention is based on the object of providing an operating method for a monitoring device and a monitoring device which is of simple design and arranged on a coupling device, by means of which can be reliably detected whether the bolt has reached the coupled position.

The method according to the invention has the advantage that no additional pressure line and also no additional bores and recesses on the coupling device are necessary. In comparison with the previously known coupling devices, only a pressure sensor which can be arranged at an easily accessible point in the pressure line which is necessary for controlling the coupling device and an evaluation device for evaluating the detected pressure signal has to be provided. The evaluation device detects here the reaching of the coupled position by the occurrence of a pressure surge in the control line which is brought about by the striking of the bolt against the stop.

A further simplification of certain preferred embodiments also consists in the fact that a plurality of coupling devices, which can also be arranged in different cylinders of the internal combustion engine, can be monitored by a single pressure sensor and a single evaluation device.

Since the enabling of the control line and the striking of the corresponding bolt against the stop are chronologically correlated, by virtue of the fact that the pressure signal is evaluated only within a predetermined time after the enabling of the pressure control line, interference signals can be reduced which can result for example from reflection of the pressure surges. At the same time, the influence which the temperature or the switching pressure of the hydraulic medium have on the time which the bolt requires to reach the coupled position can be taken into account by the provision of temperature-dependent time periods $T_1$ and $T_2$.

Other objects, advantages and novel features of the present invention will become apparent from the following detailed description of the invention when considered in conjunction with the accompanying drawings.

DETAILED DESCRIPTION OF THE DRAWINGS

Figure 1:
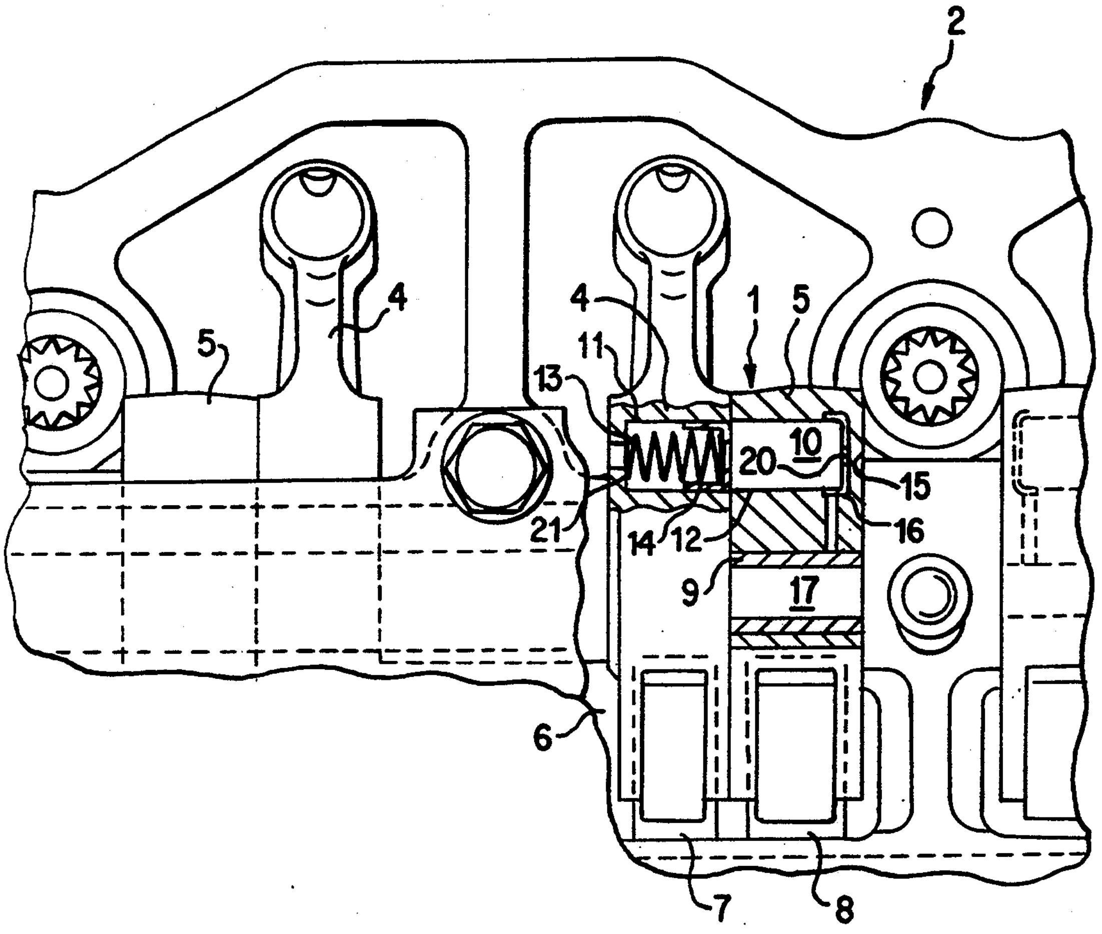
FIG. 1 is a schematic part sectional view which shows the valve gear which is arranged in the cylinder head of an internal combustion engine and has a coupling device for coupling a rocker lever to a coupling lever in top view, constructed according to a preferred embodiment of the invention.
Figure 2:
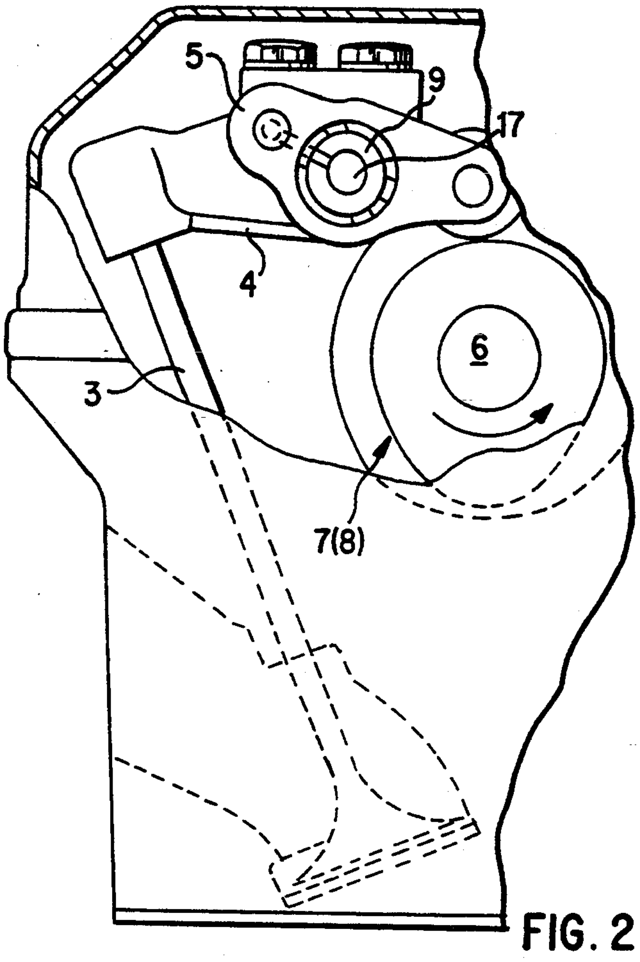
FIG. 2 is a side schematic view which shows the valve gear of FIG. 1 partially in section.
Figure 3:
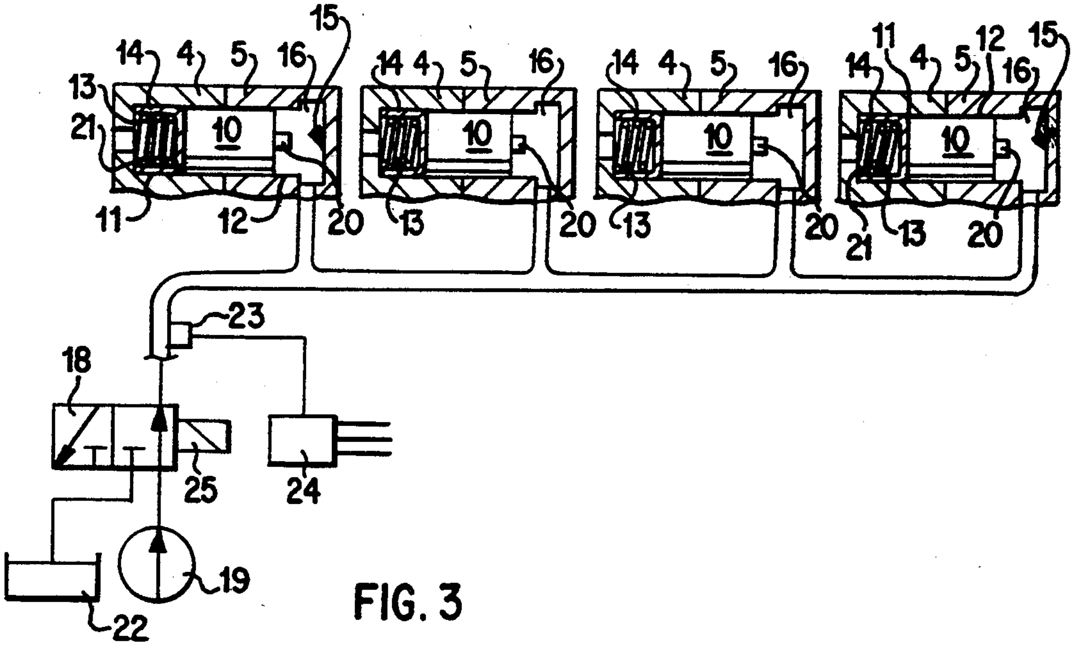
FIG. 3 is a schematic view of an evaluation device for a four-cylinder internal combustion engine, constructed according to preferred embodiments of the invention.

The coupling device 1 (illustrated in the drawing) which is already known for example from my above-identified copending application Ser. No. 08/063,711, is described only briefly below. FIGS. 1 to 3 show a cylinder head 2 of an internal combustion engine (not illustrated in greater detail) in which two inlet valves 3 per cylinder are arranged, which inlet valves 3 are driven in each case by means of transmission elements 4, 5 by a camshaft 6. In order to actuate the inlet valves 3, two cams 7, 8 per inlet valve 3 are arranged on the camshaft 6, one cam 7 driving the inlet valve 3 directly by means of a transmission element constructed as a rocker lever 4 while the other cam 8 acts on a transmission element which is constructed as a coupling lever 5. The rocker lever 4 and the coupling lever 5 are rotatably mounted on a common pivot axle 9, it being possible to form an operative connection between the coupling lever 5 and the rocker lever 4 with the aid of the coupling device 1. In this coupled position, both levers 4, 5 can only carry out common rotational movements. While the base circle diameter of both cams 7, 8 is of the same size, the cam 8 assigned to the coupling lever 5 has a different cam elevation than the cam 7 assigned to the rocker lever 4 so that in the coupled position the cam elevation of the cam 7 is ineffective.

The coupling device 1 consists of a bolt 10 which is movably guided in two bores 11, 12 which run parallel to the pivot axle 9, the rocker lever bore 11 being arranged on the rocker lever 4 and the coupling lever bore 12 being arranged on the coupling lever 5 in such a way that the openings of the two bores 11, 12 lie flush with respect to one another when the transmission elements 4, 5 rest against the respective cam base circle. A spring 13 which is provided on the side facing the coupling lever 5 with a guide cup 14 which is guided in a longitudinally displaceable fashion in the bores 11, 12 is inserted into the rocker lever bore 11. In the uncoupled state, the spring 13 presses the bolt 10 into the coupling lever bore 12 until it comes to rest against a stop 15. The bolt 10 is dimensioned here in such a way that when the bolt 10 comes to rest against the stop 15 the end facing the rocker lever 4 terminates with the contact plane so that in the uncoupled state neither does the guide cup 14 protrude into the coupling lever bore 12 nor does the bolt 10 protrude into the rocker lever bore 11.

In order to transfer the coupling device 1 into the coupled position, the side of the bolt 10 facing away from the rocker lever 4 can be acted on by a pressure medium. For this purpose, on the end face of the coupling lever bore 12 facing away from the rocker lever 4, a pressure chamber 16 is provided which has a flow connection to a pressure oil source 19 via a control pressure line 17 and a 3/2 way valve 18. The pressure chamber 16 is thus delimited by a nose 20, arranged either on the bolt 10 or on the end side of the coupling lever bore 12, which nose 20 prevents the bolt 10 resting directly on the end side of the coupling lever bore 12. By supplying pressure medium to the pressure chamber 16, the bolt 10 can thus be pressed into the rocker lever bore 11 counter to the force of the spring 13 until the guide cup 14 comes to rest against a second stop 21. At the same time, the second stop 21 is arranged in the rocker lever bore 11 in such a way that the bolt 10 cannot be pressed completely into the rocker lever bore 11 but a portion of it, for example half, still remains in the coupling lever bore 12 and thus brings about coupling of the two transmission elements 4, 5.

In this coupled position, the two transmission elements 4, 5 are connected to one another fixed in terms of rotation so that, by virtue of the other cam elevation of the cam 7 assigned to the rocker lever 4, the valve actuation curve of the inlet valve 3 is now only determined by the cam 8 assigned to the coupling lever 5.

In order to release the coupling, the control pressure line 17 is connected to an oil reservoir 22 by switching the 3/2 way valve 18, as a result of which the oil pressure in the pressure chamber 16 can drop and as a result the bolts 10 can be pressed out of the coupling lever bores 12 completely into the rocker lever bore 11 by the force of the springs 13.

According to the invention—as shown in FIG. 3—a pressure sensor 23 is arranged in the control pressure line 17, the signal d(t) of which pressure sensor 23 is transmitted to an evaluation device 24 for the purpose of monitoring the coupling process. In order to monitor the coupling process, the fact is exploited that the bolt 10 produces a pressure surge in the pressure medium system when reaching the completely coupled position as a result of striking against the second stop 21. In the evaluation device 24, the variation against time of the pressure signal d(t) is then monitored and when a pressure surge occurs it is concluded that one of the bolts 10 has reached the coupled position. The detection of a pressure surge can take place here for example by means of a continuous comparison of the pressure signal d(t) or of the pressure change d(t) with threshold values $d_{thresh}$. In a system with a plurality of coupling devices 1, in the event of a fault the evaluation device 24 can determine the defective coupling device 1 by means of a comparison with a crank angle signal KW provided by a position sensor arranged on the crankshaft.

Advantageously, a coupling device 1 can also be provided with a control device 25 which is connected to the 3/2 way valve 18 and only enables the control pressure line 17 within predetermined time periods $T_1$ so that the coupling of the transmission elements 4, 5 is only possible at quite specific times. Since the striking of the bolt 10, which is to be expected, against the second stop 21 is chronologically correlated with the starting of the coupling process, in this case the monitoring of the pressure variation d(t) only needs to take place within predetermined time periods $T_2$ after the start of the coupling process. If a pressure surge occurs within this time period $T_2$, the coupling takes place satisfactorily. Otherwise, that is to say if no pressure surge is detected, a fault in the coupling device 1 is detected and appropriate measures are taken.

The use of the control device 25 is advantageous especially in arrangements in which a plurality of coupling devices 1 of one cylinder or of different cylinders are controlled by a common control pressure line 17 and monitored by a common evaluation device 24. As a function of the cylinder sequence, it is possible that two successive coupling processes cannot be resolved with exact timing. By virtue of the selection of the time, or of the crank angle $KW_{set}$, respectively at which the 3/2 way valve 18 is opened, that coupling device 1 which is first transferred into the coupled position can be determined. Since, in any case, the first pressure surge can be detected exactly, a very accurate testing of this coupling device 1 is thus possible. The detection of the switching bolt movement of the other coupling devices 1 depends on the chronological resolution of the pressure signal. By virtue of the selection of the crank angle $KW_{set}$, in each case one of the coupling devices 1 can thus be first alternatively transferred into the coupled position for successive coupling processes, and therefore also monitored exactly.

Since the switching times of the coupling device 1 are dependent on the viscosity of the pressure medium, it is also possible to provide the time periods $T_1$ and $T_2$ as a function of the temperature or of the pressure of the hydraulic medium.

Figure 4:
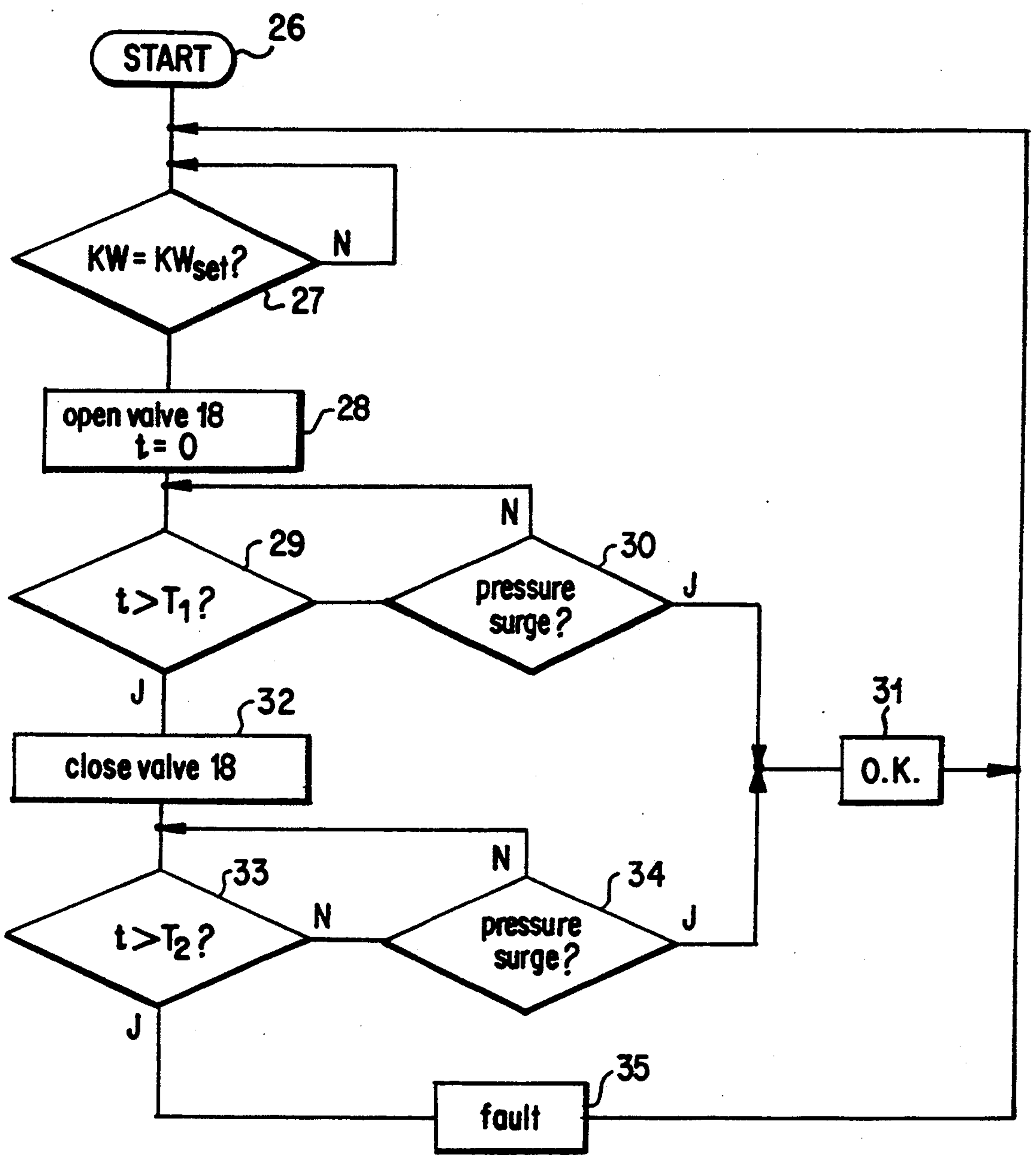
FIG. 4 shows a flow diagram of the method according to the invention.

The sequence of a method according to the invention for a multi-cylinder internal combustion engine with a single evaluation device 24 is once again described in detail below with reference to a flow diagram (FIG. 4). The method is started in block 26, for example triggered by a request signal of the engine control to actuate the coupling device 1 of a predetermined cylinder. In block 27, it is then tested as to whether a crank angle $KW_{set}$ predetermined for the respective cylinder has been reached. As long as the predetermined crank angle $KW_{set}$ has not yet been reached, branching back to the start of block 27 occurs. The 3/2 way valve 18 is then not opened in block 28 and the timing initialized to the value t=0 until the predetermined crank angle $KW_{set}$ has been reached. By means of the selection of the crank angle $KW_{set}$, that coupling device 1 which is first transferred into the coupled position, and which therefore can be exactly tested, can be selected.

In block 29, it is subsequently tested as to whether a predetermined time period $T_1$ has passed since the opening of the 3/2 way valve 18. If this is not the case, in block 30 the pressure signal d(t) is subsequently tested as to whether a pressure surge has occurred. The occurrence of a pressure surge indicates here that the pressure d(t) in the control pressure line 17 briefly exceeds the applied system pressure. This can be detected by comparing the pressure signal d(t) with a threshold value $d_{thresh}$ which exceeds the applied system pressure. A second possibility is to detect the large increases in the pressure signal d(t) which occur in the event of a short pressure peak by comparing the chronological derivation of the pressure signal d(t) with a predetermined threshold value $d_{thresh}$. If no pressure surge is detected, the method is continued in block 29. If, on the other hand, a pressure surge has been detected in block 30, an OK report which indicates that the coupled position has been reached satisfactorily is produced in block 31. Subsequently, jumping back to the start of block 27 occurs where the method for a further coupling device 1 can be continued.

If, on the other hand, no pressure surge has been detected up to the expiry of the predetermined time period $T_1$, branching occurs from block 29 to block 32 where the 3/2 way valve 18 is closed. In block 33, it is subsequently tested as to whether a predetermined time period $T_2$ has passed since the opening of the 3/2 way valve 18. As long as this time period $T_2$ has not yet expired, jumping occurs to block 34 where it is in turn tested as to whether a pressure surge has occurred in the control pressure line 17. If not, jumping back to the beginning of block 33 occurs. If, on the other hand, a pressure surge is detected in block 34, branching to block 31 occurs, where, as already described above, an OK report is produced. Finally, jumping back to the start of block 27 occurs. If it is detected in block 33 that the predetermined time period $T_2$ has expired, in block 35 a fault is detected and a corresponding signal produced. Subsequently, jumping back to the start of block 27 also occurs.

The testing of the pressure signal d(t) after the closing of the 3/2 way valve 18 in blocks 33 and 34 is necessary since, after the coupled position has been reached, a certain time period passes until the pressure surge reaches the pressure sensor 23. Thus, it is possible that the coupling device 1 reaches the coupled position within the first time period $T_1$ but the pressure surge does not reach the pressure sensor 23 until after the expiry of the first time period $T_1$. The second time period $T_2$ is therefore selected such that this time delay is compensated.

In addition to the application shown in the exemplary embodiment, the method according to the invention can of course also be used for other coupling devices 1. Thus, it is possible to arrange the pressure chamber 16 in the rocker lever bore 11 and the spring 13 in the coupling lever bore 12. In addition, more than two transmission elements 4, 5, for example also of different cylinders, can be coupled by means of a coupling device 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Method for monitoring the switching process of a coupling device which is arranged on an inlet valve or outlet valve of an internal combustion engine, the internal combustion engine having:
   - at least two transmission elements which are mounted on a common pivot axis and are each driven by a cam drive which characterizes an operating mode,
   - a coupling device for coupling adjacent transmission elements, bores which are to be placed flush with the transmission elements being provided, in which bores a bolt is mounted so as to be capable of being transferred, by supplying a pressure medium via a control pressure line, into a coupled position in which it couples the transmission elements and is secured by a stop,
   - and a pressure sensor which is arranged in the control pressure line, said method comprising:
   - evaluating the pressure signal which is recorded by the pressure sensor in an evaluation device for monitoring the coupling process by comparing the variation against time of the pressure signal with a predetermined threshold value which exceeds the system pressure to detect whether a pressure surge occurs in the control pressure line and thereby detect whether the coupled position has been reached.

2. Method according to claim 1, wherein a control device which is arranged in the control pressure line enables the control pressure line only within first predetermined time periods, wherein the evaluation device determines whether a pressure surge occurs within a predetermined second time period after the enabling of the control pressure line, and wherein, if no pressure surge occurs within the second predetermined time period, a fault in the coupling device is detected.

3. Method according to claim 1, wherein a plurality of coupling devices are arranged in various cylinders of a multi-cylinder internal combustion engine which are actuated by a common control pressure line, and wherein the variation against time of the pressure signal is detected in the common control pressure line by a single pressure sensor and evaluated by the evaluation device.

4. Method according to claim 2, wherein the control device does not enable the control pressure line to transfer the next coupling device into the coupled position until a predetermined crank angle has been reached.

5. Method according to claim 4, wherein the predetermined crank angle is predetermined in successive coupling processes in such a way that in each case different coupling devices are first transferred into the coupled position.

6. Method according to claim 2, wherein the first and second predetermined time periods are varied as a function of the temperature and of the pressure of the pressure medium.

7. Method according to claim 3, wherein the evaluation device determines the defective coupling device from a comparison with a crank angle signal in the event of a fault.

8. Method for monitoring the switching process of a coupling device which is arranged on an inlet valve or outlet valve of an internal combustion engine, the internal combustion engine having:
   - at least two transmission elements which are mounted on a common pivot axis and are each driven by a cam drive which characterizes an operating mode,
   - a coupling device for coupling adjacent transmission elements, bores which are to be placed flush being provided on the transmission elements, in which bores a bolt is mounted so as to be capable of being transferred, by supplying a pressure medium via a control pressure line, into a coupled position in which it couples the transmission elements and is secured by a stop,
   - and a pressure sensor which is arranged in the control pressure line, said method comprising:
   - evaluating the pressure signal which is recorded by the pressure sensor in an evaluation device for monitoring the coupling process by comparing the chronological derivation of the pressure signal with a predetermined threshold value ($d_{thresh}$) to detect whether a pressure surge occurs in the control pressure line, and when a pressure surge occurs and thereby detects whether the coupled position has been reached.

9. Method according to claim 8, wherein a plurality of coupling devices are arranged in various cylinders of a multi-cylinder internal combustion engine which are actuated by a common control pressure line, and wherein the variation against time of the pressure signal (d(t)) is detected in the common control pressure line by a single pressure sensor and evaluated by the evaluation device.

10. Method according to claim 8, wherein a control device which is arranged in the control pressure line enables the control pressure line only within first predetermined time periods, wherein the evaluation device determines whether a pressure surge occurs within a predetermined second time period after the enabling of the control pressure line and wherein, if no pressure surge occurs within the second predetermined time period a fault in the coupling device is detected.

11. Method according to claim 10, wherein the control device does not enable the control pressure line to transfer the next coupling device into the coupled position until a predetermined crank angle ($KW_{set}$) has been reached.

12. Method according to claim 11, wherein the crank angle ($KW_{set}$) is predetermined in successive coupling processes in such a way that in each case different coupling devices are first transferred into the coupled position.

13. Method according to claim 12, wherein the predetermined time periods are varied as a function of the temperature and of the pressure of the pressure medium.

14. Method according to claim 11, wherein the evaluation device determines the defective coupling device from a comparison with a crank angle signal (KW) in the event of a fault.

15. Apparatus for monitoring the switching process of a coupling device which is arranged on an inlet valve or outlet valve of an internal combustion engine, the internal combustion engine having:

at least two transmission elements which are mounted on a common pivot axis and are each driven by a cam drive which characterizes an operating mode, a coupling device for coupling adjacent transmission elements, bores which are to be placed flush being provided on the transmission elements, in which bores a bolt is mounted so as to be capable of being transferred, by supplying a pressure medium via a control pressure line, into a coupled position in which it couples the transmission elements and is secured by a stop, a pressure sensor which is arranged in the control pressure line, and:

an evaluation device for monitoring the coupling process by comparing the chronological derivation of the pressure signal (d(t)) of the control pressure line with a predetermined threshold value ($d_{thresh}$) to detect whether a pressure surge occurs in the control pressure line, and by detecting when a pressure surge occurs whether the coupled position has been reached.

16. Apparatus for monitoring the switching process of a coupling device which is arranged on an inlet valve or outlet valve of an internal combustion engine, the internal combustion engine having:

at least two transmission elements which are mounted on a common pivot axis and are each driven by a cam drive which characterizes an operating mode, a coupling device for coupling adjacent transmission elements, bores which are to be placed flush with the transmission elements being provided, in which bores a bolt is mounted so as to be capable of being transferred, by supplying a pressure medium via a control pressure line, into a coupled position in which it couples the transmission elements and is secured by a stop, a pressure sensor which is arranged in the control pressure line, and an evaluation device for monitoring the coupling process by comparing the amplitude (d(t)) of the pressure signal with a predetermined threshold value ($d_{thresh}$) which exceeds the system pressure to detect whether a pressure surge occurs in the control pressure line and and thereby detect whether the coupled position has been reached.

* * * * *